US007962354B2

(12) United States Patent (10) Patent No.: US 7,962,354 B2
Liew et al. (45) Date of Patent: Jun. 14, 2011

(54) BOOKING ENGINE FOR BOOKING AIRLINE TICKETS ON MULTIPLE HOST ENVIRONMENTS

(75) Inventors: Roger Liew, Chicago, IL (US); David Shemenski, Lyons, IL (US); Greg Ball, Chicago, IL (US); Warren Nisley, Evanston, IL (US); John Sokel, Streamwood, IL (US); Steve Hoffman, Chicago, IL (US); Leon Chism, Bartlett, IL (US)

(73) Assignee: Orbitz LLC, Chicago, IL (US)

( * ) Notice: Subject to any disclaimer, the term of this patent is extended or adjusted under 35 U.S.C. 154(b) by 1535 days.

(21) Appl. No.: 10/456,410

(22) Filed: Jun. 6, 2003

(65) Prior Publication Data

US 2004/0249680 A1 Dec. 9, 2004

(51) Int. Cl.
*G06Q 10/00* (2006.01)
(52) U.S. Cl. .................................. 705/6; 705/5
(58) Field of Classification Search .................. None
See application file for complete search history.

(56) References Cited

U.S. PATENT DOCUMENTS

| 2001/0053989 A1* | 12/2001 | Keller et al. ............... 705/5 |
| 2002/0152100 A1* | 10/2002 | Chen et al. ................. 705/5 |
| 2002/0156629 A1* | 10/2002 | Carberry et al. .......... 704/257 |
| 2003/0004760 A1* | 1/2003 | Schiff et al. ............... 705/5 |
| 2003/0097274 A1* | 5/2003 | Parsons ...................... 705/1 |

OTHER PUBLICATIONS

Office Action dated Oct. 6, 2009 in U.S. Appl. No. 11/624,279, 16 pages.

* cited by examiner

*Primary Examiner* — Shannon S Saliard
(74) *Attorney, Agent, or Firm* — Wildman, Harrold, Allen & Dixon LLP

(57) ABSTRACT

A system and method of booking an itinerary on at least one of a multiplicity of host environments include a plurality of host adaptor modules. Each host adaptor module is configured to interact with one of the plurality of host ticketing environments. A booking engine is provided for receiving commands related to booking the air travel itinerary and determining an appropriate host ticketing environment for processing the commands based on a number of predefined criteria. When the booking engine receives a command it forwards the command to a first host adaptor module which is associated with first host ticketing environment selected by the booking engine for processing the command. The host adaptor module receives the command and issues the command to said first host ticketing environment. The first host adaptor module in turn receives a response from the first host ticketing environment and determines whether the response comports with an expected response. If the response does not comport with the expected response, the booking engine identifies a second appropriate host environment for processing the command and forwards the command to a second host adaptor module associated with the second host ticketing environment. The second host adaptor module then issues the command to the second host ticketing environment.

12 Claims, 8 Drawing Sheets

139

WHO IS TRAVELING                                                        * REQUIRED FIELD

THE TRAVELER'S NAME SHOULD MATCH WHAT APPEARS ON HIS/HER GOVERNMENT-ISSUED ID TO AVOID CONFUSION AT AIRPORT SECURITY.

IMPORTANT: TICKETS ARE NON-TRANSFERABLE. ONCE ISSUED, AIRLINES DO NOT ALLOW PASSENGERS TO ASSIGN TICKETS TO OTHER PEOPLE OR CHANGE NAMES ON TICKETS.

FULL FIRST NAME        LAST NAME
ADULT  [JOHN DOE ▼]        OR     [                ]      [              ]

FLIGHT COST SUMMARY

TOTAL AIRFARE      $156.50
SERVICE FEE        $5.00

TOTAL FLIGHT COST  $161.50

DEPARTING FLIGHT(S)

TUESDAY, MAY 13, 2003     DEPART   10:35AM      CHICAGO MIDWAY (MDW)
NORTHWEST AIRLINES # 467           MORNING      CHICAGO

ARRIVE   12:45PM      DETROIT WAYNE COUNTY (DTW)
                                   AFTERNOON    DETROIT

MEAL: UNKNOWN
                                                ON TIME: 80%
                                                CABIN: ECONOMY
                                                EQUIPMENT: MCDONNELL DOUGLAS
                                                DC-9-30/40/50 PASSENGER (D9S)
                                                DURATION: 1H 10MIN
                                                MILES: 237

TOTAL DURATION: 1H 10MIN
                                                TOTAL MILES: 237 MILES

*FIG. 5A*

RETURNING FLIGHT(S)

TUESDAY, MAY 20, 2003    DEPART    9:35AM    DETROIT WAYNE COUNTY (DTW)
NORTHWEST AIRLINES # 1415                 MORNING    DETROIT

ARRIVE    9:46AM    CHICAGO MIDWAY (MDW)
                                                   MORNING    CHICAGO

MEAL: UNKNOWN
ON TIME: 60%
CABIN: ECONOMY
EQUIPMENT: MCDONNELL DOUGLAS DC-9-30/40/50 PASSENGER (D9S)
DURATION: 1H 11MIN
MILES: 237

TOTAL DURATION: 1H 11MIN
TOTAL MILES: 237 MILES

FLIGHT COST DETAILS

THE FARES SHOWN BELOW ARE THE LOWEST AVAILABLE FOR THIS ITINERARY

| FARE TYPE | COST | PER PERSON | SUBTOTAL |
|---|---|---|---|
| 1 ADULT | BASE AIRFARE | $128.37 | $128.37 |
|  | TAX | $28.13 | $28.13 |
|  | SERVICE FEE |  | $5.00 |
|  | TOTAL FLIGHT COST |  | $161.50 |

IMPORTANT FARE NOTES
THIS TICKET IS NON-REFUNDABLE.
CHANGES TO THIS TICKET WILL INCUR A PENALTY FEE.
READ THE FARE RULES FOR THIS TRIP

[CONTINUE]
[BACK]

*FIG. 5B*

BOOKING ENGINE FOR BOOKING AIRLINE TICKETS ON MULTIPLE HOST ENVIRONMENTS

BACKGROUND OF THE INVENTION

The present invention relates to a system and method for booking air travel itineraries on multiple host environments. The system and method provide a flexible approach toward searching for travel itineraries, calculating fares and booking tickets.

In the commercial airline industry tickets are often distributed through Global Distribution Systems (GDS), sometimes also referred to as Computer Reservations Systems (CRS). These are large computerized reservations and ticketing system such as Worldspan, Sabre, Galileo, and others. Until recently air travel itineraries could only be booked through a travel agent with access to a GDS or with the air carrier directly through the air carrier's direct host ticketing environment.

Commerce over the Internet has greatly affected the way in which airline ticketing takes place. Today there are many internet based travel sites through which individuals can search for fares, book itineraries and purchase tickets from their own personal computer, without ever speaking to or visiting a travel agent. However, while these "online travel agencies" provide reservations booking and ticketing services in a somewhat more convenient manner, they still rely on the aging Global Distributions Systems for locating itineraries calculating fares and booking tickets. The cost of searching for flights and booking itineraries on a GDS is extra overhead that must be passed on to the customer in the form of higher ticket prices. Furthermore, when tickets are purchased through a GDS there must still be some interface with the air carrier's internal ticketing environment in order for the carrier to control its flight inventory. Thus, rather than booking itineraries through a GDS a more efficient approach would be to interface directly with the air carrier's internal ticketing environment and book itineraries directly with the carriers.

Recently, an improved mechanism for searching for air travel itineraries has been developed. This improved mechanism involves removing the flight schedule and fare searching functions from the GDS and performing them separately from the reservation booking and ticketing process. By locating itineraries and fares outside the GDS environment it is possible to locate desirable itineraries and fares and then book them directly with the air carrier's host systems, bypassing the GDS altogether.

Implementing such a system, however, raises a number of difficulties. For example, direct supply links may be available for some carriers and not others. Some itineraries may include flight segments on more than one carrier, which would require multiple transactions to different carriers' internal ticketing systems. Furthermore, some categories of travel such as international air travel may only be searchable using GDSs. Thus, any system for allowing direct access to air carriers' host systems must be sufficiently flexible in order to provide access to the largest number of carriers possible, and to selectively switch from processing transactions on air carriers' host environments and GDSs as necessary to meet customers' particular demands. Thus, there is a need for a flexible air travel booking system and method of booking air travel itineraries which provides the ability to book itineraries directly on the air carriers' host environments, as well as the backup ability to book itineraries on GDSs.

SUMMARY OF THE INVENTION

The present invention relates to a system and method for booking air travel itineraries on multiple host ticketing environments. According to an embodiment of the invention a method of booking an itinerary on at least one of a multiplicity of host environments includes providing a plurality of host adaptor modules. Each host adaptor module is configured to interact with one of the host ticketing environments. A booking engine is provided for receiving commands related to booking the air travel itinerary and determining an appropriate host ticketing environment for processing the commands based on a number of predefined criteria. Commands are received by the booking engine and the booking engine determines a first host ticketing environment which is the most appropriate for processing the command. The booking engine then forwards the command to a first host adaptor module which is associated with first host ticketing environment selected by the booking engine. The host adaptor module receives the command and issues the command to said first host ticketing environment.

The first host adaptor module in turn receives a response from the first host ticketing environment and determines whether the response comports with an expected response. If the response does not comport with the expected response, the booking engine identifies a second appropriate host environment for processing the command and forwards the command to a second host adaptor module associated with the second host ticketing environment. The second host adaptor module then issues the command to the second host ticketing environment.

In another embodiment of the invention a method of booking an air travel itinerary includes the first step of receiving customer travel requirements. An initial search is performed to gather itineraries meeting the customer's requirements. The results of the search, are then displayed to the customer. An input is received from the customer indicating an itinerary in which the customer is interested. The method further includes determining an appropriate host environment for re-pricing the itinerary in which the customer is interested. Once the appropriate host environment has been determined, the itinerary of interest is re-priced on the appropriate host environment in order to obtain additional details of the itinerary of interest and to confirm the availability and price of the itinerary. The details of the itinerary are then displayed for the customer. Upon receiving an instruction from the customer to book the itinerary of interest, a determination is made as to the appropriate host environment on which to book the itinerary, and the itinerary is booked on that host environment.

In another embodiment of the invention a system for booking air travel itineraries on a plurality of different host ticketing environments is provided. The system includes at least first and second host adaptor modules configured to interact with the different host ticketing environments, an application server, and a booking engine. The booking engine is configured to receive commands and data objects from the applications server and to selectively send the commands and data objects to the first and second host adaptor modules based on predefined selection requirements. The booking engine is further configured to receive data objects from first and second host adaptor modules in response to the commands.

Additional features and advantages of the present invention are described in, and will be apparent from, the following Detailed Description of the Invention and the figures.

BRIEF DESCRIPTION OF THE FIGURES

FIGS. 5A and 5B are a detailed results page for displaying the details of an itinerary selected by the customer.

DETAILED DESCRIPTION OF THE INVENTION

The present invention relates to a system and method for booking airline tickets on multiple host environments, as well as to a booking engine for use in such a system and method. The booking engine is adapted to select an appropriate host environment from among a plurality of host environments for pricing and booking airline itineraries based on a number of criteria. Once the booking engine has selected the proper host environment, the system communicates with the selected host for the purpose of verifying fares and booking the itineraries.

Figure 1:
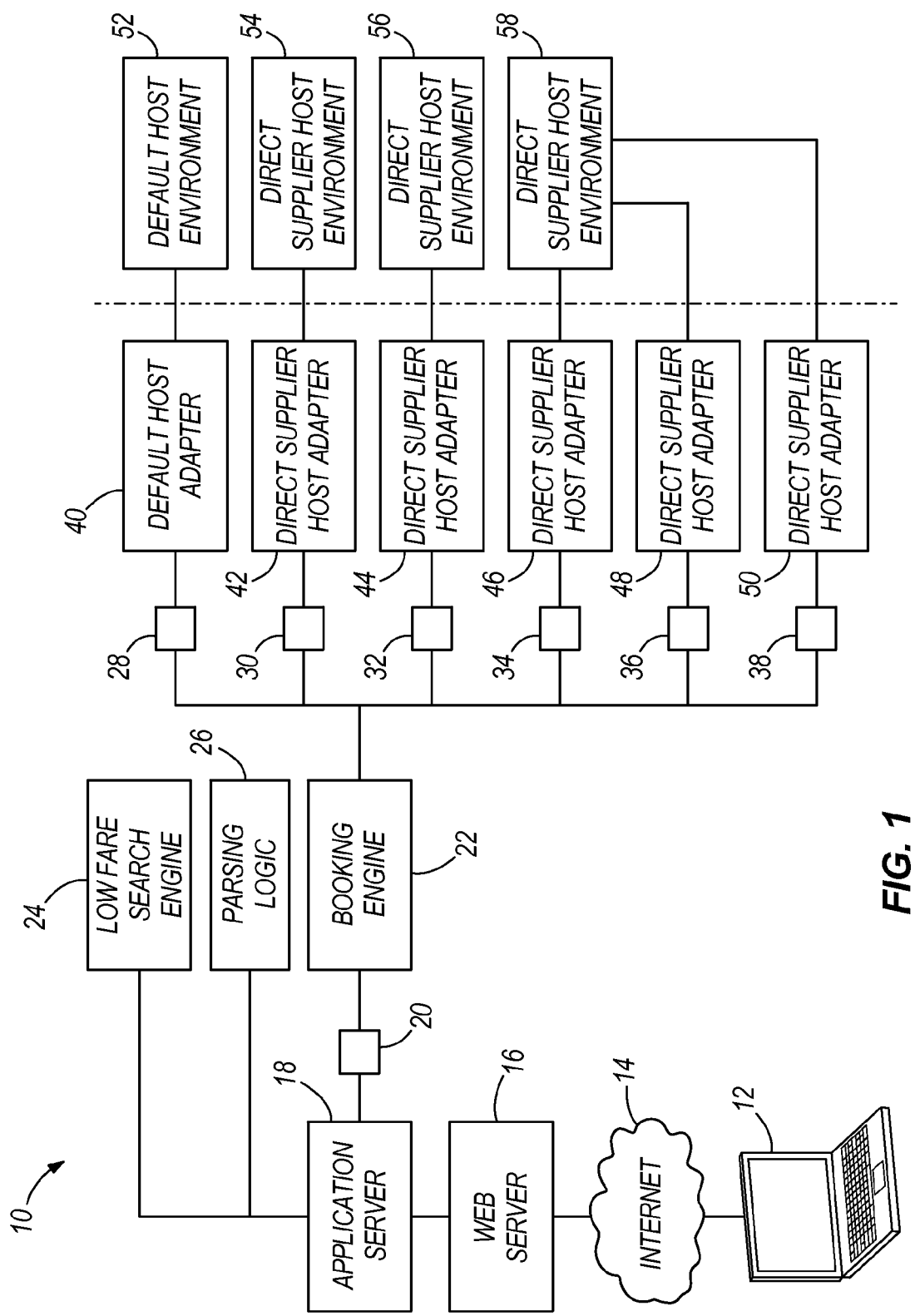
FIG. 1 is a block diagram of a system for booking air travel itineraries on multiple host environments according to an embodiment of the invention.

A system 10 according to an embodiment of the invention is shown in FIG. 1. Preferably System 10 is an internet based system wherein customers search for fares and book tickets from their own World Wide Web enabled user terminal 12 or other client display software enabled device. However, alternative arrangements are possible, such as direct connections to travel agents' desk tops and the like. Typically, the user terminal 12 will include a web browser program which allows the user terminal 12 to communicate with and retrieve information from various web servers over the internet 14. In the present case, a customer desiring to purchase airline tickets uses the user terminal 12 to contact web server 16.

Web server 16 is a dedicated web server adapted to provide a network interface between the customer and system 10. The web server 16 serves web pages to the user terminal 12 which are displayed for the customer by the user terminal's web browser. Web server 16 likewise receives input data entered by the customer through user terminal 12 and transmitted to the web server 16 over the network 14. Much of the content displayed in the various web pages sent to the user terminal 12 from web server 16 is generated by system 10 based on communications between the web server 16 and user terminal 12. However, the processing for generating the content and for carrying out instructions entered by the customer is performed by backend systems which are transparent to the customer.

Web server 16 includes application layer 18 which acts as an interpreter between the World Wide Web environment of the web server 16 and the user terminal 12, and the back end systems which carry out the fare searches and the ticket booking processes that are described in more detail below. The primary components of the backend systems include a low fare search engine 24 parsing logic 26 for interpreting search results from the low fare search engine, a first Java interface 20, a low fare booking engine 22, Java interfaces, 28, 30, 32, 34, 36, and 38, and direct supplier host adaptors 40, 42, 44, 46, 48 and 50. The direct supplier host adaptors 40, 42, 44, 46, 48 and 50 in turn communicate with various direct supplier host environments 52, 54, 56 and 58. The direct supplier host environments are not technically part of system 10, as they exist and operate independently of system 10. However, the ability to interface with and book tickets on the legacy host environments is an important feature of system 10.

The booking engine 22 acts as a logical switch, directing data requests and commands received from the application server 18 via Java interface 20 to the appropriate host environment. Upon determining which host environment is the appropriate environment to receive a data request or command, the booking engine forwards such data requests or commands to the host adaptor module 40, 42, 44, 46, 48, 50 associated with the appropriate host environment via the corresponding Java interface 28, 30, 32, 34, 36 or 38. The host adaptor module that receives the data request or command initiates a session with the host environment with which it is associated and executes whatever transactions are necessary to obtain the requested data from the host environment or to cause the host environment to perform the commanded function. Data supplied to the host adaptor by the host environment are written to the booking engine 22 via the corresponding Java interface 28, 30, 32, 34, 36 or 38, and the booking engine 22 passes the data onto the application layer 18 via the Java interface 20.

The functions and data objects defined by the Java interfaces 28, 30, 32, 34, 36 and 38 as well as Java interface 20 are substantially identical, although Java interface 20 includes some additional functionality beyond that of Java interfaces 28, 30, 32, 34, 36 and 38 for handling additional communication functions between the application server 18 and the booking engine 22 which are not required between the booking engine 22 and the host adaptor modules 40, 42, 44, 46, 48 and 50. As a result, backend communications between the booking engine 22 and the host adaptor modules are transparent to the application layer 18. The application layer 18 issues a function call or data request to the booking engine 22, and in response receives the requested data or function results in an expected format. From the application layer's 18 perspective communications go to the booking engine 22 and no further.

Likewise, transactions between the booking engine 22 and the application layer 18 are transparent to the host adaptor modules. The host adaptor modules receive function calls and data requests from the booking engine 22 and return the requested data to the booking engine 22 in the appropriate format. Unbeknownst to the host adaptor modules, the booking engine 22, passes the data on to the application server 18. Thus, the booking engine, once it has determined which host environment is the appropriate host environment for handling a transaction, merely acts as a conduit between the application server 18 and the selected host environment.

The host adaptor modules act as interpreters, converting data requests and commands into a format required by the GDS with which the individual host adaptor module is associated. The host adaptors also convert data from the GDS to a format dictated by the Java interfaces.

Operation of the system 10 will now be described in conjunction with the flow chart 90 shown in FIGS. 2a, 2b, and 2c and the sample web pages shown in FIGS. 3, 4 and 5A and 5B. Flow chart 90 shows the steps necessary to search for and book travel itineraries on system 10. Although a customer may abandon a search/booking session at anytime prior to actually booking an itinerary, the present description will refer to the entire process as "the booking process."

Figure 3:
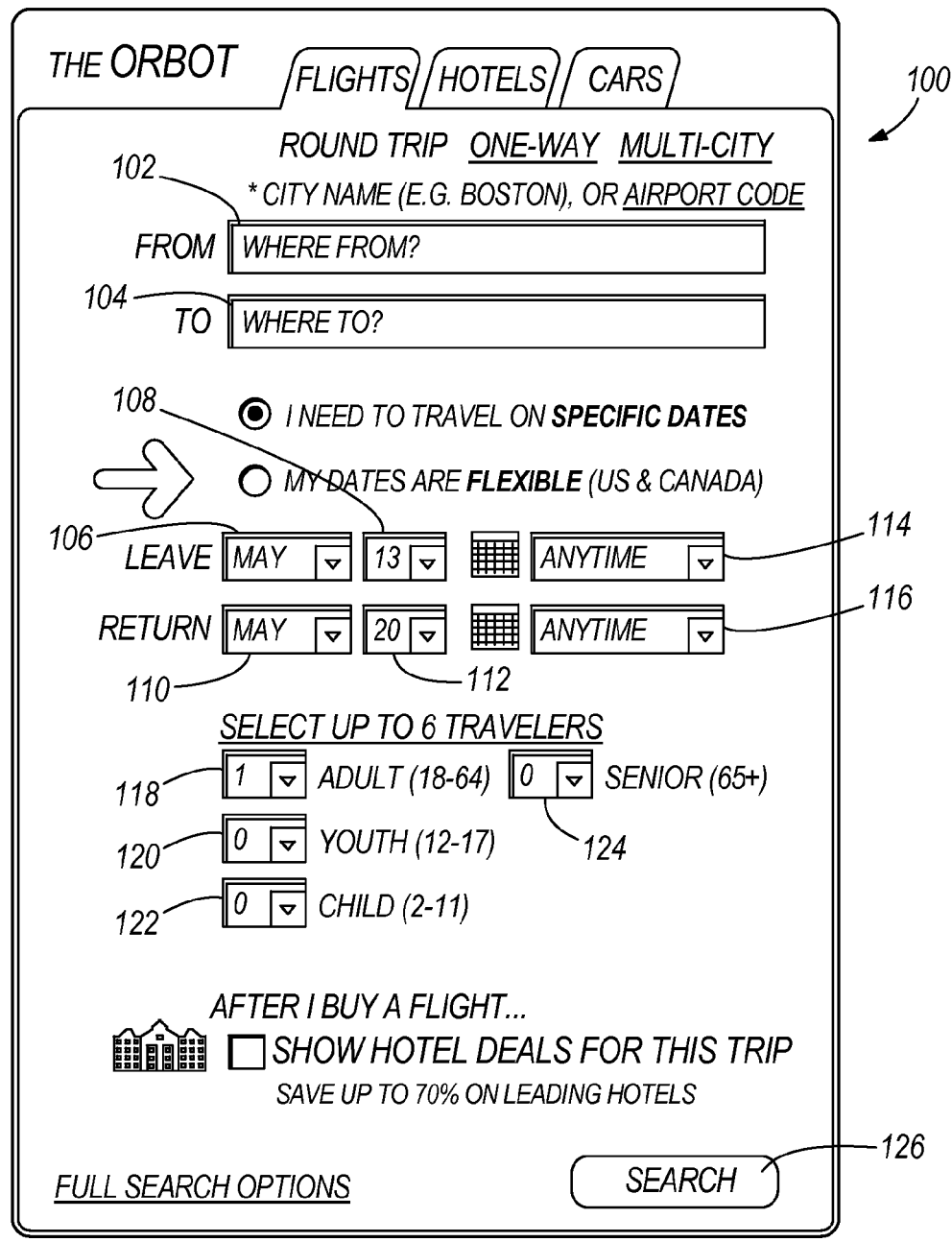
FIG. 3 is a search page for entering a customer's travel requirements.

The booking process begins at step S1 when a customer initiates a session with the web server 16. A session begins when a customer accesses a travel website hosted by web server 16. The customer may access the travel website by typing the URL identifying the web server 16 into the address line of his or her web browser; following a hypertext link to the webserver; or by otherwise contacting the webserver 16 over the network 14. A web page including prompts for eliciting data for an itinerary search is transmitted from the web server 16 to the user terminal 12 over the internet 14 as is well known in the art. An example of a web page 100 including search criteria prompts is shown in FIG. 3. The web page 100 includes an origination field 102, a destination field 104, a departure month field 106, a departure day field 108, return month field 110 and a return day field 112, time of day fields 114, 116 as well as fields 118, 120 and 122 and 124 for entering the number of travelers in various passenger categories such as adults, youths, seniors and children.

Step S2 of the booking process is the step of executing an initial search for itineraries (available flights and associated fares) that meet the customer's requirements. The customer initiates a search by entering data in the search fields corresponding to his or her travel requirements and selecting the "SEARCH" soft button 126 on the search page 100 shown in FIG. 3. Selecting the search button 126 causes the user terminal 12 web browser to send the information entered in the various data fields from the user terminal 12 to the web server 16 over the network 14.

Web server 16 receives the search request from the user terminal 12 and forwards the search parameters to the application layer 18. The search itself may be performed on a traditional GDS system or on an independent database of scheduled flights and fare data using a low fare search engine 24. In general, searches using an independent database and the low-fare search engine are preferred, however, factors such as the type of data available on the independent database and/or contractual obligations with GDS operators, air carriers and the like, may require certain classes of searches to be performed on one or another GDS. For example, according to an embodiment of the invention searches are divided on the basis of foreign versus domestic flights. Domestic flights are searched on an independent database and international flights searched on a GDS. The system on which fare data are searched is significant, as it will impact the decision as to which legacy host environment will ultimately be used to book a particular itinerary.

The application layer 18 employs a software process which it receives from the booking engine 22 to determine where the initial search is to be conducted based on the search criteria submitted by the customer. If the search is to be performed by the low-fare search engine the application layer 18 converts the data submitted by the customer into an XML format recognized by the low-fare search engine 24 and submits a query. The low fare search engine 24 processes the query and returns the results to the application layer 18. The software downloaded from the booking engine 22 to the application layer parses, filters, transforms and remaps the data from the lowfare search engine. The result of this processing is a number of separate pricing solutions for itineraries that meet the customer's requirements. Each pricing solution is a data object that includes at least a fare, the identity of the host environment on which the fare was priced, the flight segments comprising the itinerary and the fare basis codes relied on for constructing the fare.

Similarly, if the application server 18 determines that a search must be done on the default host environment 52, the application server 18 initiates a low fare search on the default host environment, which is one of the interface functions implemented on the Java interfaces 20, 28, 30, 32, 34, 36, and 38. For the purposes of the present description the default host environment will be the Worldspan GDS 52 in accordance with an embodiment of the invention. However, if desired other GDSs could be designated as the default Host Environment. When the initial search is performed on the default GDS the customer's travel requirements are supplied as input data parameters to the low fare search function. The low fare search returns a number of pricing solutions for itineraries that meet the customer's requirements.

The application server 18 initiates the low fare search on the booking engine 22 via the Java interface 20. The request is completed when the booking engine 22 returns to the application server either one or more pricing solutions, or one of a number of predefined error message indicating a failure of the low fare search. On receiving the Low Fare Search Request, the booking engine 22 forwards the request to the default host environment by invoking an low fare search function via the Java interface associated with the default GDS 52 (i.e, Java interface 28). The host adaptor module 40 associated with the default host environment 52 receives the request, initiates a session with the default host environment 52 and requests a search for itineraries meeting the customer's requirements. The default host environment 52 returns the search results to the host adaptor module 40. The host adaptor module 40 configures the results into pricing solutions whose format is defined by the Java interface 28 and returns the pricing solutions to the booking engine 22. The booking engine 22 in turn forwards the pricing solutions to the application server 18 via the Java interface 20.

The pricing solutions generated by the parsing logic on itinerary data received from the low fare search engine are of the same format as pricing solutions received from the booking engine 22 for low fare searches performed on the default host environment. In step S3 of booking process the results of the fare search whether performed by the low fare search engine or by the default host environment, are displayed to the customer. The application layer parses the pricing solutions returned by the low fare search engine or from the Air Price Request sent to the default host environment and creates a search results web page which the web server 16 sends to the user terminal 12 for display to the customer by the user terminal 12 web browser.

The low fare search engine 24 and the booking engine 22 are stateless devices. Once the search results are sent to the application layer 18 their roles are complete and they maintain no record of the search or the results. Data regarding each search, including the environment on which the search was performed, are included in each pricing solution and each pricing solution is maintained by the application layer 18.

Figure 4:
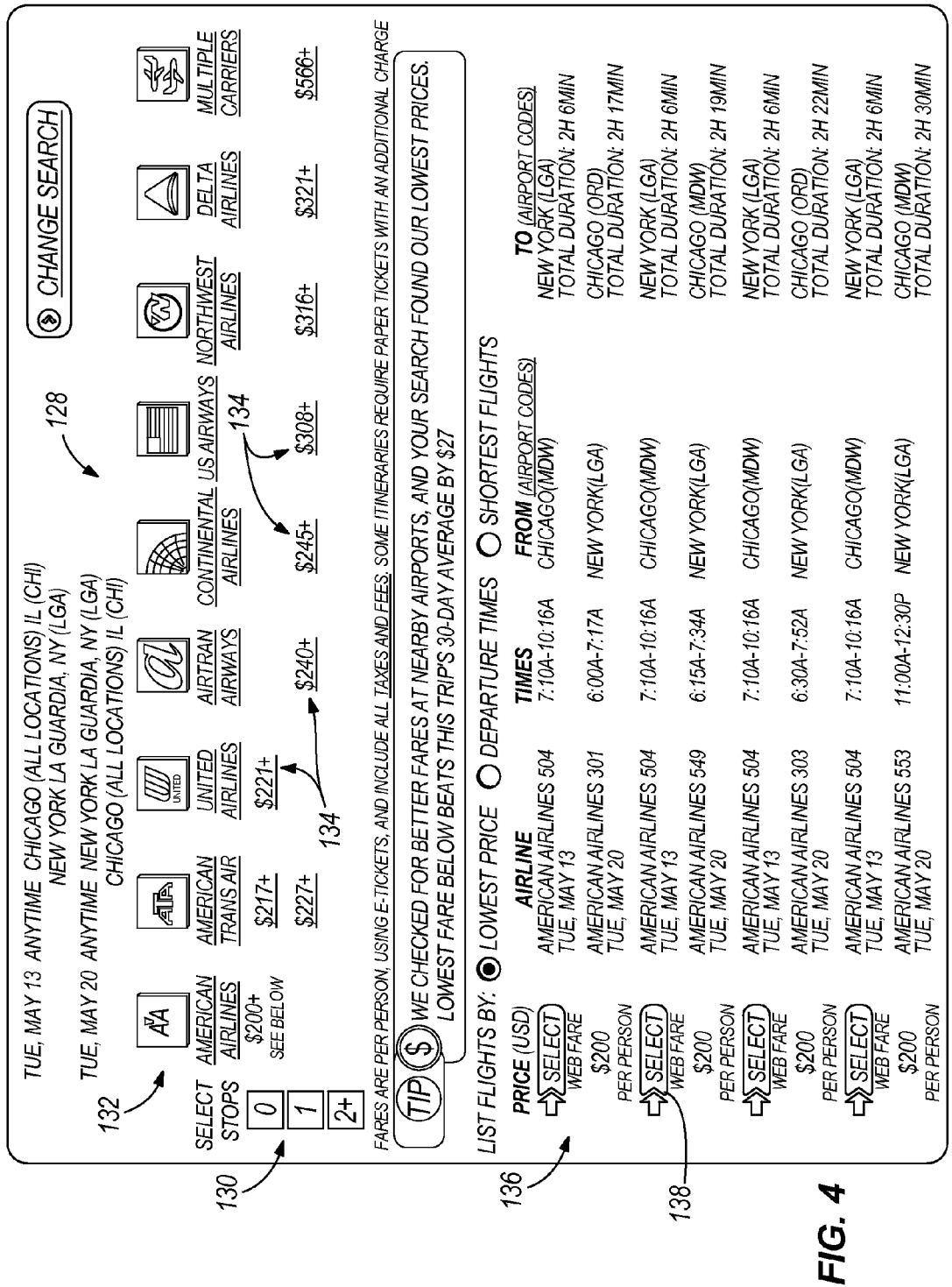
FIG. 4 is a search results page for displaying itineraries meeting a customer's requirements to the customer.

An example of a search results page transmitted by the web server to the user terminal is shown in FIG. 4. A number of fares 134 meeting the customer's general requirements are displayed in a matrix 128. The number of stops included in the flight itinerary is shown along the vertical axis 130 and the airlines which are offering the fares are shown along the horizontal axis 132. Limited details 136 of each itinerary are listed vertically below the display matrix. The fares 134 listed in the matrix may be linked to the corresponding details display 136 such that by mouse clicking a particular fare shown in the matrix will cause the details of the corresponding flight to be displayed at the top of the details list.

After displaying the initial search results in step S3, the booking process moves to step S4 where the customer identifies an itinerary that he or she is interested in booking. The customer makes his or her selection from among all of the itineraries listed on the results page by mouse clicking the "SELECT" soft button 138 adjacent the itinerary of interest.

This executes software at the client terminal 12 which causes a message to be sent to the web server 16 identifying the corresponding itinerary of interest.

Because domestic itineraries returned by the low-fare search engine 24 are obtained from a database outside a traditional GDS environment previously relied upon by the airlines, the availability of itineraries and fares located by the low fare search engine 24 are not guaranteed by the airlines. Before an itinerary can be booked on the system 10, the selected itinerary and associated fare must be searched for and verified on a legacy system having guaranteed fare constructions. This requires an additional "Re-price Air Request" to be performed on a legacy system. Furthermore, since the booking engine 22 is stateless, it retains no record of previously performed searches. Therefore, a Re-price Air Request to re-acquire the details of a particular itinerary is necessary even if the initial search was performed on the default host environment where the initial fare constructions are guaranteed.

A Re-price Air Request is initiated at step S5. When the customer clicks the "SELECT" soft button 138 adjacent to a displayed itinerary, the customer's selection is forwarded to the application layer 18 which initiates the Re-price Air Request. The Re-Pricing Air Request is another of the communications functions implemented in the Java interfaces 20, 28, 30, 32, 34, 36 and 38. The application layer 18 supplies the pricing solution for the selected itinerary that resulted from the original search to the booking engine 22 along with a command to re-price the itinerary. The booking engine 22 receives the request, and in response supplies a re-priced pricing solution for the particular itinerary selected to the application server 18 via the Java interface 20. The repriced pricing solution returned by the booking engine 22 is written over the original pricing solution and the repriced pricing solution simply becomes the new "pricing solution" for the itinerary going forward in the transaction.

Prior to executing the Re-price Air Request, however, the booking engine 22 must first identify the appropriate host environment on which to re-price the itinerary. At step S6 the booking engine determines whether a direct supplier link is available for the selected itinerary. This determination is made in accordance with a number of rules encoded in the operational logic of the booking engine 22. Ideally, itineraries are re-priced and booked directly on the legacy host environments of the air carriers whose flights are included in the itinerary. However, for technical and/or contractual reasons, this may not always be possible. For example, an operator of the system 10 may have contractual obligations with a GDS such that fares originally searched on that GDS must be booked on that GDS if and when the customer decides to actually purchase tickets. A technical obstacle may be that a carrier's host environment does not have provisions for generating and delivering paper tickets. In such a case, a transaction in which a customer requests an paper ticket must be directed to the default host environment rather than the air carrier's legacy host system. Also, itineraries that include flight segments on different carriers cannot be direct supplier linked due to the conflict between the multiple carriers.

However, booking itineraries directly on the air carrier's legacy host environment is the preferred method of booking itineraries. Therefore, each transaction is direct supplier linked if possible. Only if supplier linking is not available will the transaction be routed to the default host environment. That being said, once any part of a transaction has been performed on the default host environment, it will remain with the default host environment until the entire booking process is completed or the transaction has been abandoned. If the booking engine 22 determines at step S6 that a direct supplier link is not available for the selected itinerary, the booking engine 22 directs Re-price Air Request to the default host environment, and the itinerary is re-priced on the default host environment 52 in step S8.

In making the determination at step S6 whether a direct supplier link is available or not, the booking engine 22 identifies the source of the pricing solution included in the Re-price Air Request and the air carrier (or air carriers) involved in the itinerary described in the pricing solution. If the pricing solution originated in the default host environment a direct supply link is not available and the transaction proceeds to step S8 where the Re-price Air Request is performed on the default host environment. If the pricing solution did not originate on the default host environment, the booking engine must still determine whether the direct supplier link to the air carrier's legacy host environment can service the request.

The legacy host environments of the various carriers will each have different rules and different capabilities. Before directing a transaction to the specific host environment directly associated with an air carrier, the booking engine 22 must also determine whether sending the transaction to the host environment will comport with the operating rules and current capabilities of the host environment. If not, the transaction must again be routed to the default host environment where the Re-price Air Request is performed at step S8. Some host specific limitations may include such things as segment limits, passenger count limits, e-ticket limitations, and the like. The direct supplier link may also have volume limitations, such that, for example, only a percentage of eligible transactions are direct supplier linked and the rest are routed to the default host environment. If the booking engine 22 determines at step S6 that a direct supplier link is available for the selected itinerary the transaction proceeds to Step S7 where the Re-price Air Request is performed on the legacy host environment of the air carrier involved in the transaction.

To re-price the itinerary on the direct supplier link host environment, the booking engine 22 sends the same Re-price Air Request as that issued by the application server 18 to the host adaptor module associated with the appropriate legacy host environment. Again, the Re-price Air Request is a communication function implemented on the Java interface 28, 30, 32, 34, 36 or 38 associated with the appropriate host adaptor module. The host adaptor module receives the Re-price Air Request, including the original pricing solution for the itinerary selected. The host adaptor then initiates a session with the corresponding legacy host environment, and requests a search and a fare construction for the itinerary contained in the pricing solution. The host adaptor receives the results from this search from the legacy host environment and returns a re-priced pricing solution to the booking engine 22 via the associated Java interface.

Unlike the initial search where the system 10 was attempting to identify all available itineraries meeting a customer's requirements, the Re-price Air Request search is a narrowly focused search attempting to locate a single itinerary and fare construction exactly corresponding to the itinerary selected by the customer, to the exclusion of all others. All of the data describing the itinerary, such as the origination, destination, travel dates and times, flight numbers and fare construction codes are included in the pricing solution sent from the application layer 18 to booking engine 22 and from the booking engine 22 to the appropriate host adaptor module. Thus, when the host adaptor module requests a re-price search on the legacy host environment there is little or no ambiguity as to the exact itinerary the host adaptor is attempting to search for and re-price.

Initially, the host adaptor commands the legacy host environment to price the itinerary exactly as coded in the initial pricing solution. The legacy host environment performs the Re-Pricing Search according to its own internal processes and returns the results to the associated host adapter module. The host adaptor module parses the results received from the direct supplier host environment and sends a re-priced pricing solution to the booking engine 22. Prior to sending the re-priced pricing solution to the booking engine, however, the host adaptor module first determines whether the requested fare is still available and whether the re-priced pricing solution matches the original pricing solution within certain predefined parameters as indicated in step S12. If not, or if the re-priced itinerary and fare is no longer available the host adaptor may send a "price-lowest fare" search command to the direct supplier host environment. In some cases, the host environment will return a fare that is equivalent or better than the actual fare being re-priced. In such cases the itinerary and fare corresponding to the price lowest fare search are returned to the booking engine as the re-priced pricing solution. If, after performing the price lowest fare search, the fare contained in the original pricing solution is still not available, the host adaptor returns an error message to the booking engine in lieu of a re-priced pricing solution.

If the fare returned by the legacy host environment to the host adaptor module is lower than the initially priced fare or if it is within a preset tolerance range above the initial fare as determined at step S12, the results may be sent to the customer for display in step S13 and the direct supplier link is continued. Otherwise, if the Re-price Air Request data do not match the initial pricing solution data, the booking engine 22 quits the direct supplier link and resubmits the Re-Pricing Air Request on the default host environment at step S8.

When the Re-price Air Request is sent to the default host environment, substantially the same steps are performed on the default host environment as those just described for performing the Re-price Air Request on the direct supplier legacy host environment. The booking engine sends the Re-price Air Request, including the original pricing solution from the application layer 18, to the host adaptor module 40 associated with the default host environment 52. The host adaptor module 40 initiates a session with the default host environment 52 and requests a search and a fare construction for the itinerary of interest. The host adaptor 40 receives the search results from the default host environment and creates a new pricing solution to be sent to the booking engine 22. Of course, prior to sending the pricing solution to the booking engine 22, the host adaptor module 40 checks the results to ensure that they match the initial search results contained as shown in step S9. As with the re-pricing step performed on the direct supplier host environment, if the results do not match the host adaptor module may request a "price lowest fare" search, or the like, in order to locate an itinerary that matches the itinerary of interest within specified tolerances. If the results match, the process moves to step S13 where the re-priced search results are displayed to the customer. If not, an error code is returned to the booking engine and an error message is displayed to the customer as shown in step S10.

In either case, whether the Re-pricing Air Request is performed on the direct supplier legacy host environment or on the default host environment, a new re-priced pricing solution is returned to the booking engine 22 and is forwarded to the application server 18. This re-priced pricing solution includes data as to which host environment performed the Re-price Air Request. After the re-pricing step has been successfully completed and the detailed flight and fare data have been sent to the application server 18, the stateless booking engine promptly "forgets" the entire transaction and moves on to the next transaction submitted by the application server. The application server 18 assembles the data from the re-priced pricing solution and prepares a detailed itinerary display page for displaying the itinerary and the re-priced fare data. The detailed itinerary page is then sent to the web server 16 which sends it to user terminal 12 over the network 14. The user terminal 12 web browser then displays the re-priced search results included in the detailed itinerary page to the customer as indicated in S13. A sample detailed itinerary page is shown in FIGS. 5A and 5B.

The detailed itinerary page 139 includes a "Continue" soft button 140. The customer may mouse-click on the "continue" soft button if he or she wishes to continue the transaction and book the displayed itinerary. Alternately, the customer may return to the initial results page 128 of FIG. 4 by selecting the "Back" soft button 142. Clicking on the "continue" soft button causes a message to be sent from the user terminal to the web server 16, indicating the customer's desire to book the itinerary.

The web server receives the request to continue at step S14. Additional data about the prospective passenger is gathered at step S15. An additional web page is sent to the user terminal 12 to elicit this additional information. The web page includes fields for prompting the user to enter personal data such as the user's phone number, credit card information, and the like. The customer information page also contains a "continue" soft button which the user selects after entering the appropriate data in the various fields displayed on the page. Again, the "continue" soft button causes an executable script associated with the displayed web page to be executed causing a message to be sent from the user terminal 12 back to the web server 16 via the network 14. The message indicates that the user desires to continue the transaction to purchase the itinerary and includes all of the passenger data entered by the customer.

The application server 18 initiates an Air Purchase Request at step S16. The application server 18 sends the Air Purchase Request to the booking engine 22 via the Java Interface 20. The purchase request includes the previously retrieved pricing solution for the selected itinerary as well as the newly acquired customer data. At step S17 the booking engine 22 determines which host environment provided the pricing solution for the itinerary which the customer wants to purchase. This information is included in the pricing solution itself. The booking engine 22 sends the Air Purchase Request to the host adaptor module corresponding to the host environment identified in step S17. The host adaptor module in turn initiates a session with the corresponding host environment and at step S18 performs a Re-price Request to confirm availability of the itinerary. The host environment returns the re-priced search results to the host adaptor module and the host adaptor module compares the results to the pricing solution provided with the purchase request at step S19.

If the re-priced results do not match the previous pricing solution, the host adaptor module returns an availability error message to the booking engine 22. The booking engine forwards the availability error message to the application layer 18 which prepares an availability error display page which is sent to the customer terminal 12 by the web server 16 over network 14, for display to the customer at step S20. Since the itinerary is no longer available, the transaction ends at step S21. The customer must either pick another itinerary or perform a new search in order to continue. If, on the other hand, the re-price search results do in fact match the previously obtained search results, the host adaptor module sends a command to the corresponding host environment to book the itinerary. The host adaptor module instructs the host environment to create a PNR at step S22. This is the formal step of creating the itinerary and associating it with the customer within the host environment (i.e., booking the itinerary in the customer's name in the direct supplier linked host environment).

During the course of processing the Purchase Air Request price, a credit card authorization process is performed to ensure against fraud and to ensure that the customer has funds available to purchase the itinerary. The transaction may not move forward until credit card authorization is received at step S23.

After the PNR has been created and credit card authorization has been received, the booking engine instructs the host adaptor to complete the itinerary at step S24. This and the remaining steps occurs on whichever legacy host environment on which the PNR was created. Thus, if the PNR was created on the direct supplier linked host environment, the booking engine instructs the corresponding host adaptor module to complete the itinerary. Likewise, if the PNR was created on the default host environment 52, the booking engine 22 instructs host adaptor module 40 to complete the PNR. The host adaptor module instructs the legacy host environment, be it the direct supplier linked host environment or the default host environment, to the same effect.

Completing the itinerary is the final step in booking the itinerary. The host environment generates a unique record which is assigned to the PNR. The record includes a record identifier which allows the host to locate the customer's itinerary and access the details of the itinerary upon request. The record identifier created by the host environment is then sent back to the booking engine 22 via the corresponding host adaptor module and Java interface. The booking engine 22 then creates its own record locator based on the record identifier created by the host environment. The record locator created by the booking engine includes coded data identifying the host environment on which the itinerary was booked. The booking engine 22 then stores the record locator along with all the details of the customer's itinerary and the including host generated PNR on its own central database.

The booking engine 22 then drives the credit charges to the host on which the itinerary was booked in step S25. The host charges the customer's credit card for the price of the ticket or tickets plus a service fee to be paid to the operator of the system 10. When the transaction is complete the booking engine 22 sends the booking engine generated record locator to the application layer 18. The application layer 18 creates a confirmation page that includes the record locator, and the web server 16 sends the confirmation page to the user computer 12 at step S26. The customer may then use the record locator to monitor the customer's PNR for flight changes and the like. The booking process ends at step S27.

Figure 2A:
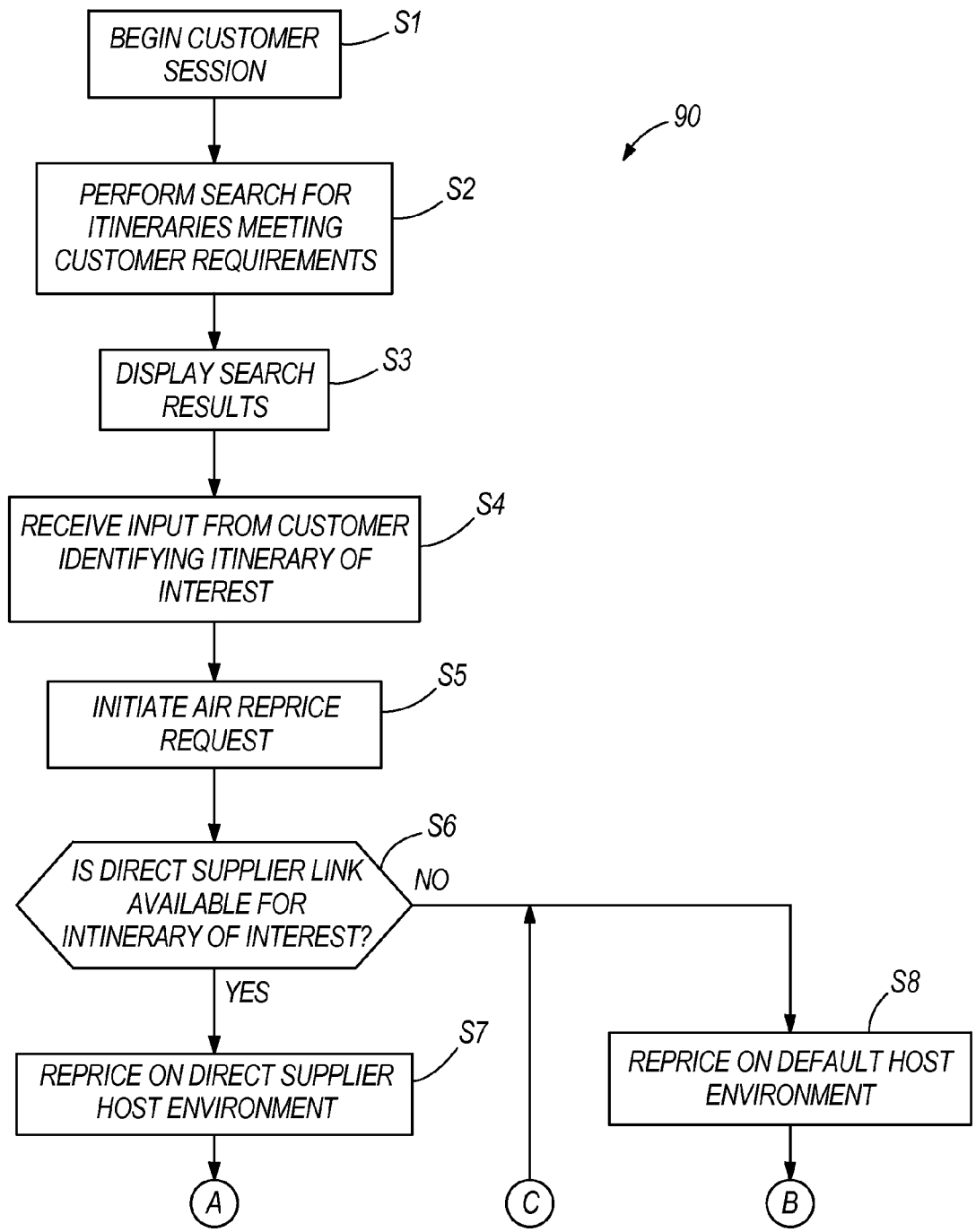
FIGS. 2A, 2B and 2C form a single flow chart of a method of booking air travel itineraries on multiple host environment according to an embodiment of the invention.
Figure 2B:
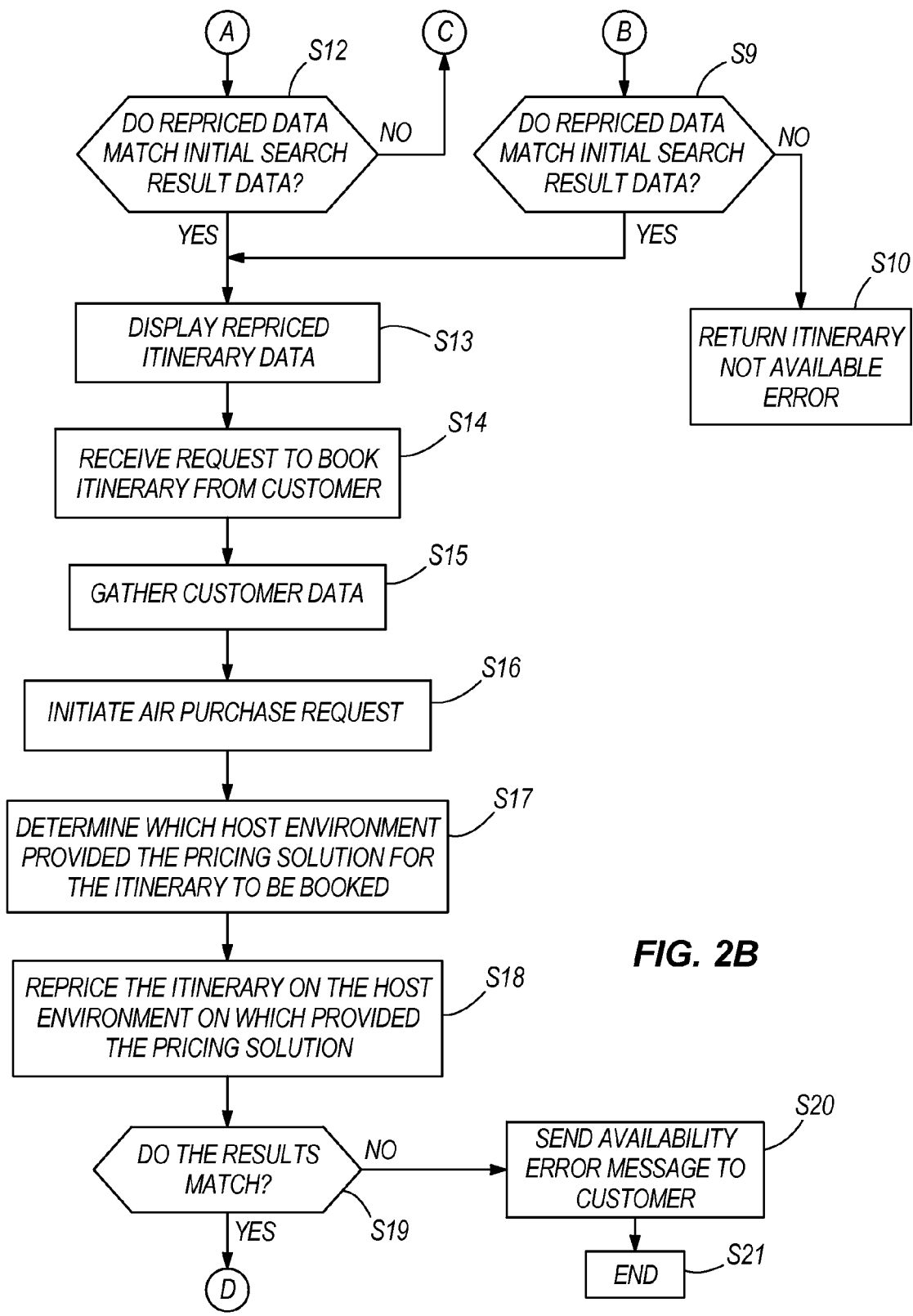
Figure 2C:
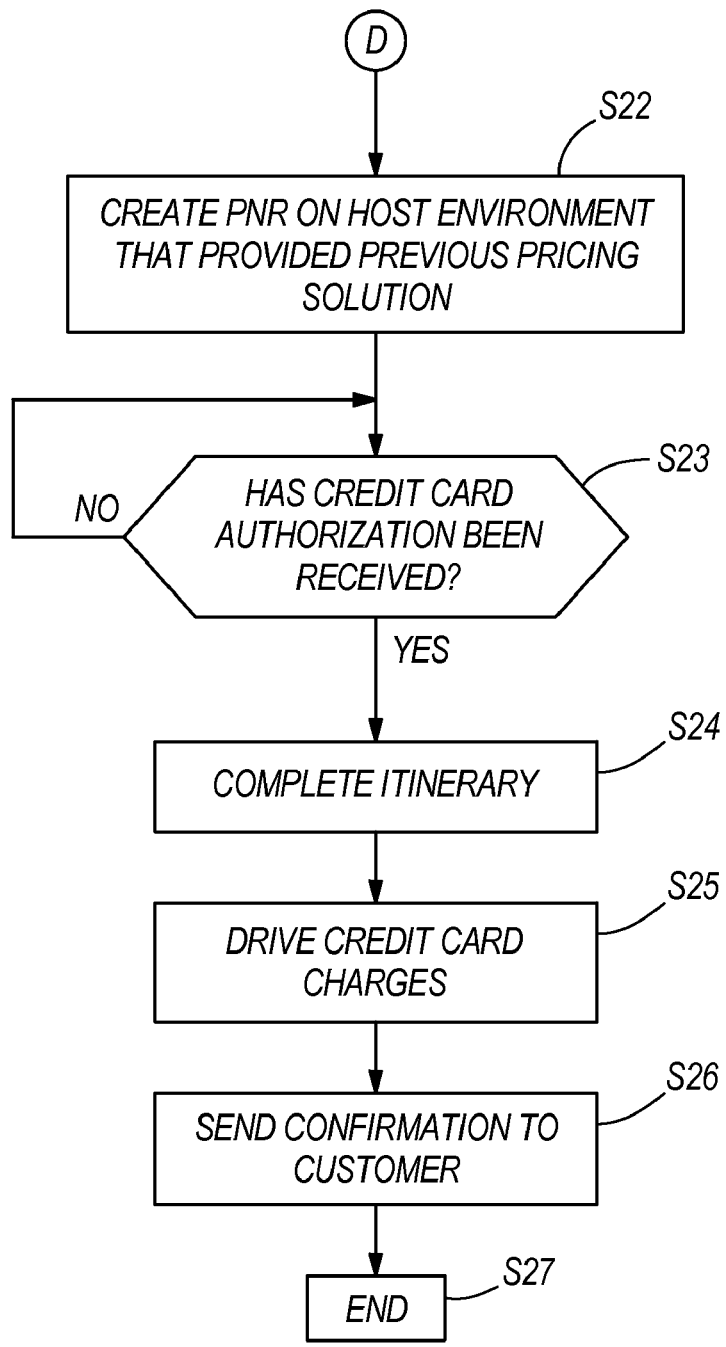

Thus, the system shown in FIG. 1 and the method shown in the flow chart of FIGS. 2A, 2B, and 2C provide flexible ticketing processes by which itineraries may be booked on various host ticketing environments. Furthermore, the system and method of the present invention allow itineraries to be booked directly on the legacy host systems of the air carriers themselves. If such direct supplier linking is unavailable for any reason the system and method have the flexibility to proceed to book itineraries in a more conventional manner on the default host environment.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of booking an air travel itinerary on one of a plurality of different host ticketing environments, comprising the steps of:
   providing a plurality of host adaptor modules, each host adaptor module being configured to interact with one of said host ticketing environments;
   providing a booking engine for determining an appropriate host ticketing environment for processing commands based on predefined criteria;
   performing a low fare search for air travel itineraries and displaying search results of air travel itineraries from the low fare search;
   determining that an air travel itinerary has been selected from the search results of air travel itineraries from the low fare search;
   receiving a command at said booking engine related to re-pricing said air travel itinerary upon determining the air travel itinerary selected from the search results of air travel itineraries;
said booking engine determining a first appropriate host ticketing environment for processing the command related to re-pricing the selected air travel itinerary;
   said booking engine forwarding said command related to re-pricing the selected air travel itinerary to a first host adaptor module associated with said first host ticketing environment;
   said first host adaptor module issuing said command related to re-pricing the selected air travel itinerary to said first host ticketing environment;
   said first host adaptor module receiving a response to said command related to re-pricing the selected air travel itinerary from the first host ticketing environment; and
   said booking engine forwarding said command related to re-pricing the selected air travel itinerary to a second host adaptor module associated with a second host ticketing environment if said response does not comport with an expected response, if said response does comport with the expected response then information associated with the air travel itinerary selected is displayed.

2. The method of claim 1 further comprising the steps of:
   determining whether said response comports with the expected response; and
   if said response does not comport with said expected response, said booking engine determines the second host ticketing environment for processing said command; and
   said second host adaptor module issuing said command to said second host ticketing environment.

3. A method of booking an air travel itinerary on one of a plurality of different host ticketing environments, comprising the steps of:
   providing a plurality of host adaptor modules, each host adaptor module being configured to interact with one of said host ticketing environments;
   providing a booking engine for determining an appropriate host ticketing environment for processing commands related to booking air travel itineraries based on predefined criteria;
   performing a low fare search for air travel itineraries and displaying search results of air travel itineraries from the low fare search;

determining that an air travel itinerary has been selected from the search results of air travel itineraries from the low fare search;

receiving a command at said booking engine related to re-pricing said air travel itinerary upon determining the air travel itinerary selected from the search results of air travel itineraries;

said booking engine determining a first appropriate host ticketing environment for processing the command;

said booking engine forwarding said command related to re-pricing the selected air travel itinerary to a first host adaptor module associated with said first host ticketing environment;

said first host adaptor module issuing said command related to re-pricing the selected air travel itinerary to said first host ticketing environment;

said first host adaptor module receiving a first response to said command related to re-pricing the selected air travel itinerary from said first host ticketing environment;

said first host adaptor module determining whether said response matches an expected response within a predefined tolerance range; and if said response does not match the expected response within the predefined tolerance range, said first host adaptor module issuing a second command to said first host ticketing environment, if said response does match the expected response within the predefined tolerance range then information associated with the air travel itinerary is displayed.

4. The method of claim 3 further comprising the steps of:

said first host adaptor module receiving a second response from said first host ticketing environment;

said first host adaptor module determining whether said second response matches the expected response within the predefined tolerance range; and if the second response does not match the expected response within the predefined tolerance range, the first host adaptor module sending an error message to the booking engine.

5. The method of claim 4 further comprising the steps of:

said booking engine receiving an error message from said first host adaptor module;

selecting a second appropriate host ticketing environment for processing the command; and forwarding the command to a second host adaptor module associated with the second host ticketing environment.

6. A system for booking air travel itineraries on a plurality of different host ticketing environments, the system comprising:

first and second host adaptor modules, each host adaptor module configured to interact with one of said host ticketing environments; and a booking engine, wherein said engine is configured to receive commands and data objects from an application server, the application server configured to determine that an air travel itinerary has been selected by a user from a plurality of air travel itineraries displayed as search results, the application server sends a command to re-price the selected air travel itinerary to the booking engine, the booking engine configured to selectively send commands and data objects to said first and second host adaptor modules based on predefined selection requirements and to receive data objects from said first and second host adaptor modules in response to the commands selectively sent to said first and second host adaptor modules.

7. The system of claim 6 further comprising a first interface module between the application server and the booking engine, a second interface module between the booking engine and the first host adaptor module and a third interface module between the booking engine and the second host adaptor module.

8. The system of claim 7 wherein the interface modules are configured such that communications between the booking engine and the first and second host adaptor modules are transparent to the application server, and communications between the application server and the booking engine are transparent to the first and second host adaptor modules.

9. The system of claim 6 wherein the booking engine is configured as a logical switch such that commands received from the application server are passed on to one or the other of said first and second host adaptor modules and data objects received from said first or second host adaptor modules are passed on to the application server.

10. The system of claim 6 further comprising a low fare search engine so that air travel itineraries may be searched independently of said first and second host environments.

11. The system of claim 10 wherein one of said predefined selection requirements comprises an indication as to whether an itinerary search was performed on said low fare search engine or on one of said host environments.

12. The system of claim 6 wherein one of said host environments is designated a default host environment, and wherein one of said predefined selection requirements comprises determining whether a prior received function call had been processed by the default host environment.

* * * * *